(12) United States Patent
Temerowski, II et al.

(10) Patent No.: US 11,422,085 B2
(45) Date of Patent: Aug. 23, 2022

(54) SIGNAL DETECTION SYSTEM FOR IMPROVED MICROPHONE-CONTROLLABLE DEVICE SECURITY

(71) Applicant: AT&T Intellectual Property I, L.P., Atlanta, GA (US)

(72) Inventors: Gary Brian Temerowski, II, Flower Mound, TX (US); Lauren Savage, Santa Clara, CA (US); Jami Carter Brooks Daly, Dallas, TX (US); Joshua West, Leander, TX (US); Martin Patrick McEnroe, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 276 days.

(21) Appl. No.: 16/876,886

(22) Filed: May 18, 2020

(65) Prior Publication Data

US 2021/0356387 A1 Nov. 18, 2021

(51) Int. Cl.
*G01N 21/17* (2006.01)
*G06F 3/16* (2006.01)
*H04R 5/04* (2006.01)
*G10L 25/51* (2013.01)
*G06F 21/83* (2013.01)
*G10L 17/00* (2013.01)

(52) U.S. Cl.
CPC ....... *G01N 21/1702* (2013.01); *G01N 21/171* (2013.01); *G06F 3/167* (2013.01); *G06F 21/83* (2013.01); *G10L 17/00* (2013.01); *G10L 25/51* (2013.01); *H04R 5/04* (2013.01)

(58) Field of Classification Search
None
See application file for complete search history.

(56) References Cited

U.S. PATENT DOCUMENTS

| | | | |
|---|---|---|---|
| 10,565,978 B2* | 2/2020 | Maziewski | H04K 3/00 |
| 2019/0237096 A1* | 8/2019 | Trella | G10L 15/22 |
| 2020/0243067 A1* | 7/2020 | Maziewski | G06F 21/566 |
| 2022/0078556 A1* | 3/2022 | Stachura | H04K 3/46 |

* cited by examiner

*Primary Examiner* — Paul W Huber

(57) ABSTRACT

A method and apparatus for detecting a photoacoustic light signal to prevent unauthorized voice commands for a microphone-controllable device are provided. The method includes receiving, by a processor, a signal, detecting, by the processor, that the signal is a photoacoustic signal generated by a thermal expansion and contraction of an object caused by at least one lightwave applied to the object, and activating, by the processor, a counter-measure to prevent the photoacoustic signal from reaching a microphone of a microphone-controllable device in response to detecting the photoacoustic signal.

20 Claims, 5 Drawing Sheets

SIGNAL DETECTION SYSTEM FOR IMPROVED MICROPHONE-CONTROLLABLE DEVICE SECURITY

The present disclosure relates generally to device security, and more particularly to methods, computer-readable media, and apparatuses for detecting photoacoustic signals generated by light signals for improved security of microphone-controllable devices.

BACKGROUND

Virtual assistants are becoming a ubiquitous tool or application for many users. Virtual assistants can be connected to various devices around the home and business, such as appliances, lights, garage doors, locks, electronics, and the like. Voice commands can be used to activate the virtual assistants and control these devices.

SUMMARY

The present disclosure broadly discloses methods, non-transitory (i.e., tangible or physical) computer-readable storage media, and apparatuses for detecting a photoacoustic light signal to prevent unauthorized voice commands for a microphone-controllable device. For instance, in one example, a processing system including at least one processor may receive a signal, detect that the signal is a photoacoustic signal generated by a thermal expansion and contraction of an object caused by at least one lightwave applied to the object, and activate a counter-measure to prevent the photoacoustic signal from reaching a microphone of a microphone-controllable device in response to detecting the photoacoustic signal.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Examples of the present disclosure include methods, non-transitory (i.e., tangible or physical) computer-readable storage media, and apparatuses detecting photoacoustic signals generated by light signals for improved security of microphone-controllable devices. As noted above, virtual assistants are becoming a ubiquitous tool or application for many users. The virtual assistants may be deployed on microphone-controllable devices that use voice commands to perform various functions. For example, the microphone-controllable devices may receive voice commands and translate the voice commands into an action via the virtual assistant. The actions may include opening a garage door, turning an electronic device on and off, opening a lock on a door, controlling another connected electronic device in a car or a home, and the like.

However, these microphone-controllable devices can be attacked using photoacoustic signals that mimic voice commands. The photoacoustic signals may be generated by lightwaves (e.g., a laser pulse) onto an object that can absorb the lightwaves to create thermal expansion. The thermal expansion may radiate acoustic waves caused by thermal expansion and contraction caused by the lightwaves. The lightwaves can be controlled (e.g., the timing of the pulses) to create acoustic waves that may mimic voice commands. These unauthorized voice commands can be used to silently transmit commands to the microphone-controllable devices. As a result, unscrupulous actors my attempt to unlock doors to homes, control electronic devices, and the like, using the silently transmitted commands.

The present disclosure provides additional security components to the microphone-controllable devices that can detect photoacoustic signals. Once detected, the security components can either prevent transmission of the photoacoustic signals to the microphone of the microphone-controllable device, prevent execution of the command associated with the photoacoustic signal, and/or create a counter-signal to cancel the photoacoustic signal. These and other aspects of the present disclosure are discussed in greater detail below in connection with the examples of FIGS. 1-5.

Figure 1:
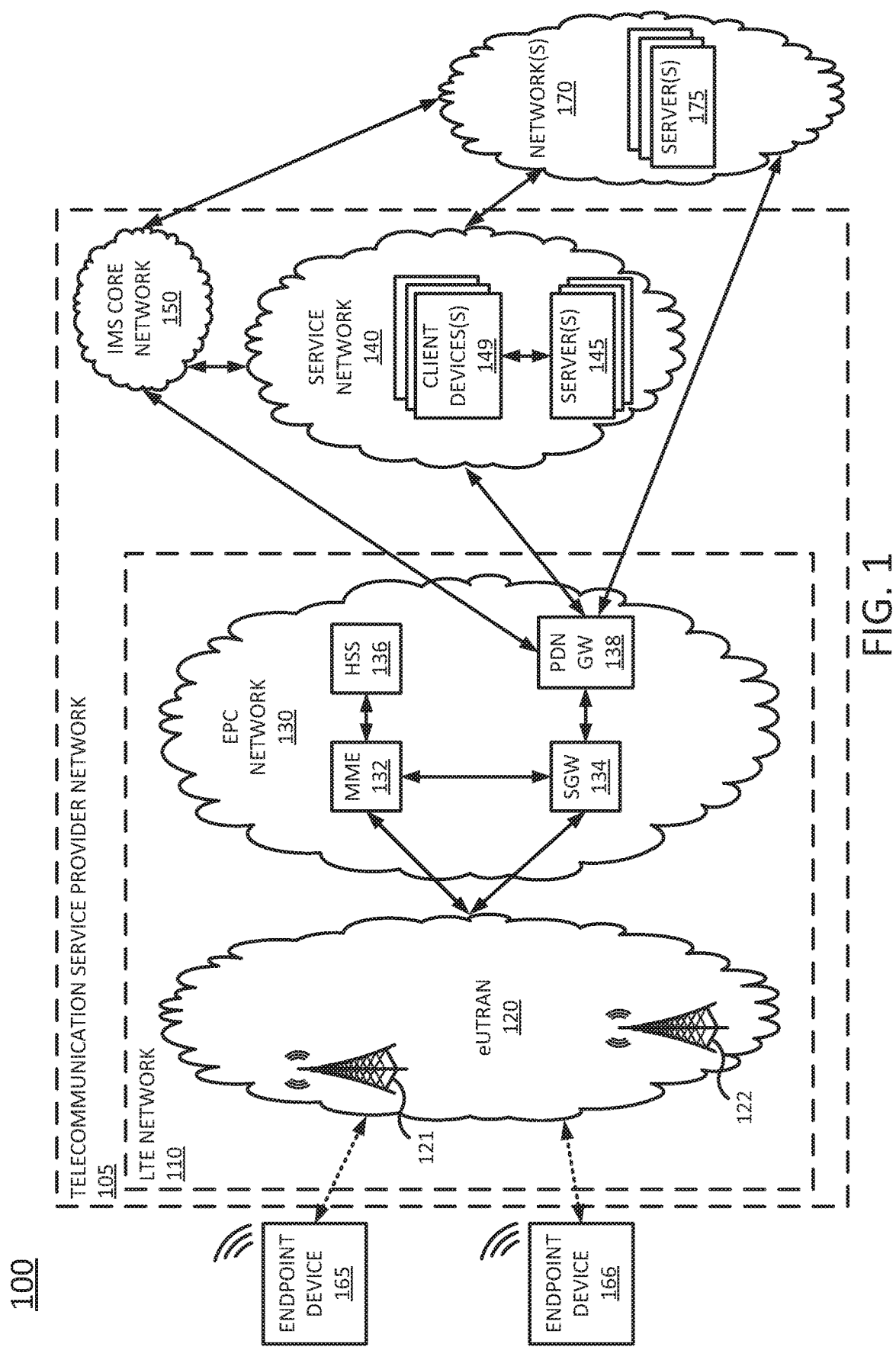
FIG. 1 illustrates an example of a system including a telecommunications service provider network, according to the present disclosure.

FIG. 1 illustrates an example network, or system 100 that may implement or support examples of the present disclosure for detecting photoacoustic signals generated by light signals for improved security of microphone-controllable devices. In one example, the system 100 includes a telecommunications service provider network 105. The telecommunications service provider network 105 may comprise a Long Term Evolution (LTE) network 110, a service network 140, and a core network, e.g., an IP Multimedia Subsystem (IMS) core network 150. The system 100 may further include other networks 170 connected to the telecommunications service provider network 105. As shown in FIG. 1, the system 100 may connect endpoint devices 165 and 166 with devices, e.g., servers 175 in networks 170, application server 145 in service network 140, etc., with other endpoint devices (not shown) and/or with other components of telecommunications service provider network 105.

As illustrated in FIG. 1, each of the endpoint devices 165 and 166 may comprise, for example, a microphone-controllable device. The microphone-controllable device may be connected to the service provider network 105. Voice commands and/or requests for information directed at the microphone-controllable device may be transmitted through the telecommunications service provider network 105 and replies may be received back through the telecommunications service provider network 105.

In one example, endpoint devices 165 and 166 may be equipped for cellular and non-cellular wireless communication. For instance, endpoint devices 165 and 166 may include components which support peer-to-peer and/or short range wireless communications. Thus, each of the endpoint devices 165 and 166 may include one or more radio frequency (RF) transceivers, e.g., for cellular communications and/or for non-cellular wireless communications, such as for IEEE 802.11 based communications (e.g., Wi-Fi, Wi-Fi Direct), IEEE 802.15 based communications (e.g., Bluetooth, Bluetooth Low Energy (BLE), and/or ZigBee communications), and so forth.

In addition, in one example, each of the endpoint devices 165 and 166 may comprise all or a portion of a computing device or processing system, such as computing system 500 as described in connection with FIG. 5 below, specifically configured to perform various steps, functions, and/or operations in connection with examples of the present disclosure for detecting photoacoustic signals generated by light signals for improved security of microphone-controllable devices. In one example, each of endpoint devices 165 and 166 may comprise a voice-activated assistant application. In one example, the voice-activated assistant application may be configurable over-the-air, e.g., by an operator of telecommunications service provider network 105.

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the 3rd Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeBs 121 and 122 in the eUTRAN 120, are in communication with the EPC network 130. In operation, LTE user equipment or user endpoints (UEs), such as endpoint device 165 and/or endpoint device 166, may access wireless services via the eNodeBs 121 and 122 located in eUTRAN 120. It should be noted that any number of eNodeBs can be deployed in an eUTRAN.

In EPC network 130, network devices such as Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G, 3G, and 5G wireless networks.

In addition, EPC (common backbone) network 130 may comprise a Home Subscriber Server (HSS) 136 that contains subscription-related information (e.g., subscriber (or "user") profiles), performs authentication and authorization of a wireless service user, and provides information about the subscriber's location. The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW.

In one example, service network 140 may comprise one or more devices for providing services to subscribers, customers, and/or users. For example, telecommunications service provider network 105 may provide a cloud storage service, a web server hosting service, and other services. Alternatively, or in addition, one or more devices of service network 140 may be for providing services to internal users and/or automated systems of the telecommunications service provider network 105. As such, service network 140 may represent aspects of telecommunications service provider network 105 where infrastructure for supporting such services may be deployed. In the example of FIG. 1, service network 140 may include servers 145. In one example, each of the servers 145 may comprise all or a portion of a computing device or processing system, such as computing system 500 as described in connection with FIG. 5 below, specifically configured to perform various steps, functions, and/or operations for detecting photoacoustic signals generated by light signals for improved security of microphone-controllable devices, in accordance with the present disclosure.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 5 and discussed below) or multiple computing devices collectively configured to perform various steps, functions, and/or operations in accordance with the present disclosure.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of networks. As illustrated in FIG. 1, networks 170 include one or more servers 175 which may each comprise all or a portion of a computing device or processing system, such as computing system 500 as described in connection with FIG. 5 below, specifically configured to perform various steps, functions, and/or operations in connection with examples of the present disclosure for detecting photoacoustic signals generated by light signals for improved security of microphone-controllable devices.

It should be noted that the system 100 has been simplified. In other words, the system 100 may be implemented in a different form than that illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, various elements of eUTRAN 120, EPC network 130, service network 140, and IMS core network 150 are omitted for clarity, including gateways or border elements providing connectivity between such networks, internal routers within EPC network 130, and so on. Similarly, due to the relatively large number of connections available between devices in the system 100, various links between MME 132, SGW 134, eNodeBs 121 and 122, PDN GW 138, AS 145, and other components of system 100 are also omitted for clarity.

In accordance with the present disclosure, any one or more of the components of EPC network 130 may comprise network function virtualization infrastructure (NFVI), e.g., host devices (i.e., physical devices) configured to operate as various virtual network functions (VNFs), such as a virtual MME (vMME), a virtual HHS (vHSS), a virtual serving gateway (vSGW), a virtual packet data network gateway (vPGW), and so forth. For instance, MME 132 may comprise a vMME, SGW 134 may comprise a vSGW, and so forth. In this regard, the EPC network 130 may be expanded (or contracted) to include more or less components than the state of EPC network 130 that is illustrated in FIG. 1. For instance, EPC network 130 may be expanded to include additional PDN gateways, e.g., in the form of vPGWs, additional serving gateways (SGWs), e.g., in the form of vSGWs, and so forth. In one example, the host devices may be deployed in one or more geographically diverse data centers. Accordingly, in one example, the network may be segregated into a number of zones, where different VNFs may be deployed in different zones depending upon the respective locations of the one or more data centers. The host devices and VNFs may be controlled by a software defined network (SDN) controller and/or a self-optimizing network (SON) orchestrator, for example.

In addition, although aspects of the present disclosure have been discussed above in the context of a long term evolution (LTE)-based network, examples of the present disclosure are not so limited. For example, the teachings of the present disclosure can be applied to other types of wireless networks (e.g., a 2G network, a 3G network, a 5G network and the like, an IEEE 802.11-based network, or a future technology or standard-based network, a network implementing various combinations of any one or more of the foregoing technologies, and so on). In one example, servers 145, servers 175, and/or other components may comprise cloud-based and/or distributed data storage and/or processing systems comprising one or more servers at a same location or at different locations. In addition, although the servers 145 and client devices 149 illustrated as components of service network 140, in other examples, any one or more of these components may be deployed in a different configuration. For instance, one or more of the servers 145 may comprise a component of service network 140, LTE network 110, IMS core network 150, and so forth, or may be fully or partially deployed in networks 170. Thus, these and other modifications are all contemplated within the scope of the present disclosure.

Figure 2:
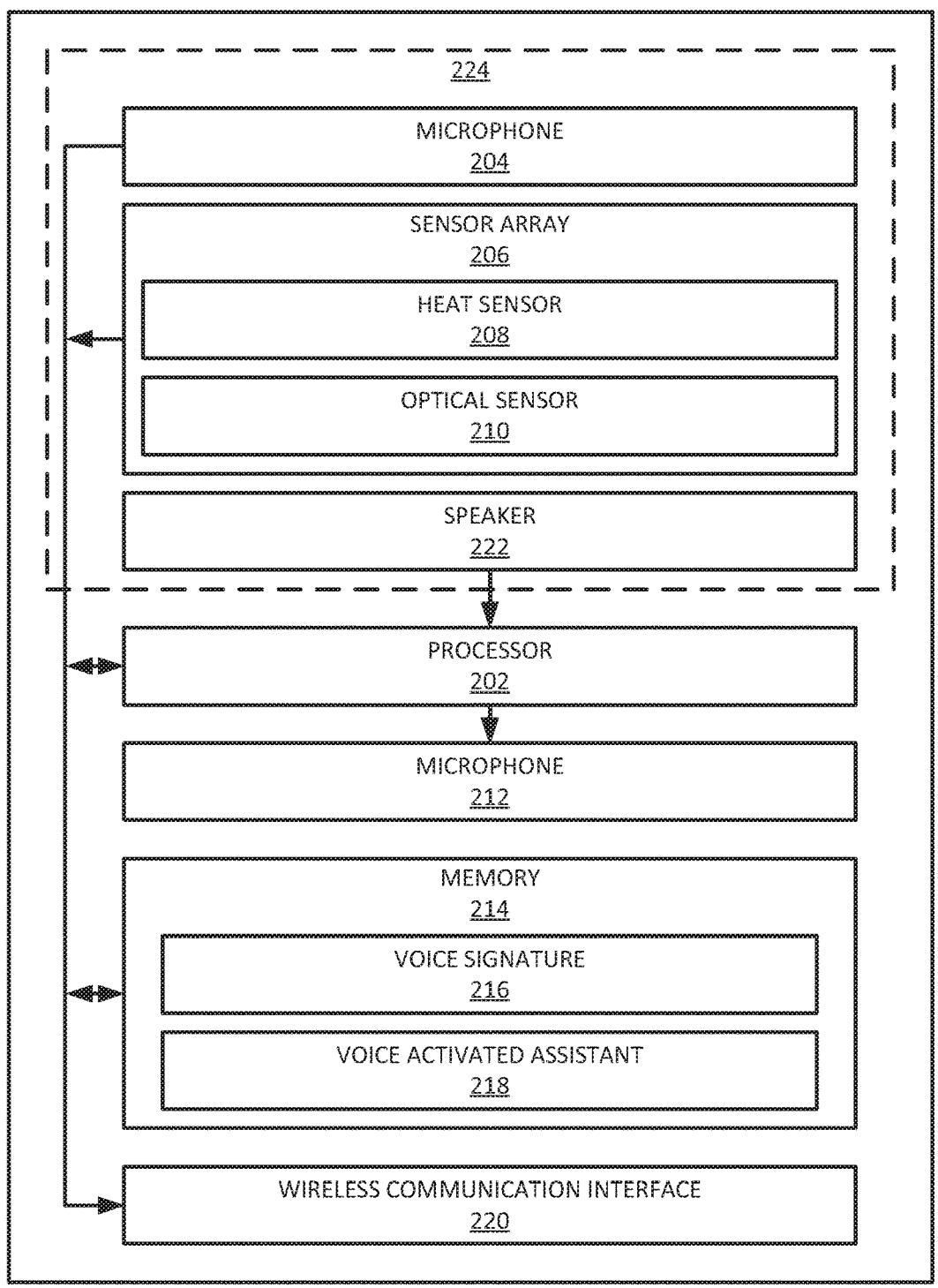
FIG. 2 illustrates an example microphone controllable device with signal detection for improved security of the present disclosure.

To further aid in understanding the present disclosure, FIG. 2 illustrates an example system microphone controllable device 200. The microphone controllable device 200 may also be one of the endpoint devices 165 or 166 illustrated in FIG. 1 and described above.

In one embodiment, the microphone controllable device 200 may include a processor 202, at least one photoacoustic detection device 224, and a microphone 212. The microphone controllable device 200 may also include a memory 214 and a wireless communication interface 220. The memory 214 may include a voice signature 216 and a voice activated assistant 218. The voice signature 216 may be used in some embodiments to detect whether the signal is a photoacoustic signal generated by a thermal expansion and contraction of an object caused by lightwaves.

In one embodiment, the voice activated assistant 218 may execute commands associated with the signal. For example, the signal may include a voice command to open a door. The voice activated assistant 218 may generate a control signal responsive to the signal representative of a voice command. The control signal may be transmitted to a receiver of the door via the wireless communication interface 220. The door may then be opened in response to the control signal.

In one embodiment, the at least one photoacoustic detection device 224 may analyze an incoming signal to determine if the signal is a photoacoustic signal. As noted above, the photoacoustic signal may be generated by a thermal expansion and contraction of an object caused by one or more lightwaves. For example a single pulse from a light source may be a lightwave. When the light source is pulsed, the light source may emit multiple segments of light referred to as lightwaves. In one embodiment, it may be possible to generate a photoacoustic signal with a single lightwave. In one embodiment, the photoacoustic signal may be generated by pulsing the light source to generate lightwaves directed at the object. The object may be a different object nearby the microphone controllable device 200 or the microphone controllable device 200 itself. The photoacoustic signal can be used by an unscrupulous actor to simulate a voice command to take control of an electronic device communicatively connected to the microphone controllable device 200.

Figure 3:
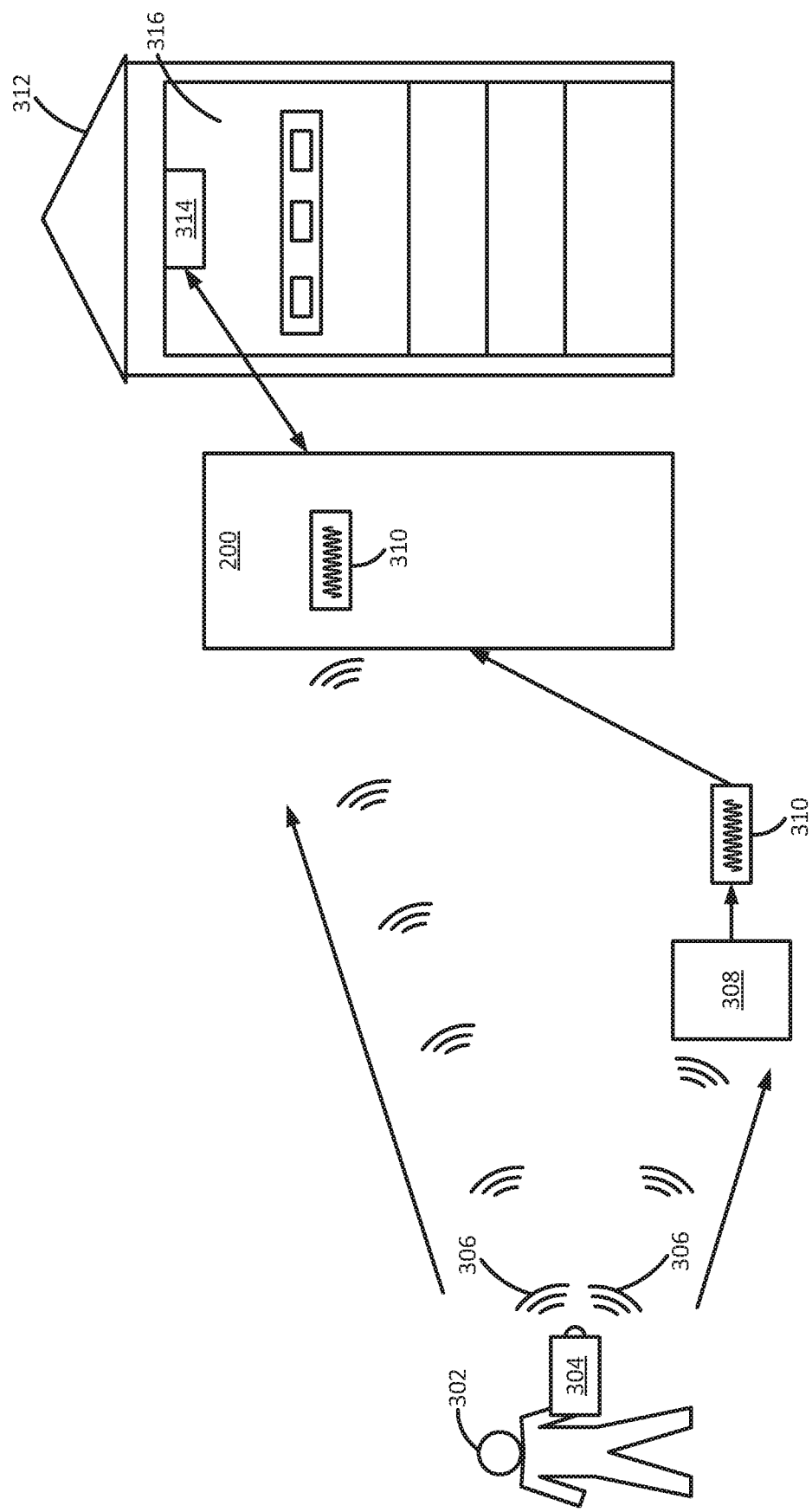
FIG. 3 illustrates an example block diagram of a photoacoustic signal generated by lightwaves used to attack the microphone controllable device of the present disclosure.

FIG. 3 illustrates an example of how a photoacoustic signal 310 can be generated. A user 302 may be trying to send an unauthorized control signal and hack, or take control of, an electronic device 314. In one embodiment, the electronic device 314 may be a garage door opener to open a door 316 of a home 312. However, it should be noted that the electronic device 314 may include other devices such as a light, a television, a drone, a component in a vehicle, an electronic lock on a door, and the like. The microphone controllable device 200 may be communicatively connected to the electronic device 314. For example, the microphone controllable device 200 and the electronic device 314 may be connected wirelessly over a common WiFi network or local area network of the home 312.

In one embodiment, voice commands transmitted to the electronic device 314 may control operation of the electronic device 314. For example, voice commands such as "open door" or "close door" may be used to activate the electronic device 314 to open and close the door 316.

In one embodiment, light waves 306 may be used to generate the photoacoustic signal 310 that mimics the voice commands. In an example, a light source 304 may be used to generate the lightwaves 306. In one embodiment, the light source 304 may be a laser. The lightwaves 306 may be pulses of laser light emitted from the light source 304. The lightwaves 306 may be applied to an object 308 that is located near the microphone controllable device 200 or may be applied directly onto a portion of the microphone controllable device 200.

The lightwaves 306 may cause the object 308 or a portion of the microphone controllable device 200 to thermally expand and contract. The thermal expansion and contraction of the object 308 or the portion of the microphone controllable device 200 may create the photoacoustic signal 310. The photoacoustic signal 310 may have a waveform that simulates speech or voice commands used by the microphone controllable device 200. The timing of the pulses of lightwaves 306 may control a shape of the waveform to mimic different voice commands.

Without proper detection capabilities, the microphone controllable device 200 may not be able to distinguish a difference between the photoacoustic signal 310 and a real voice command. As a result, the photoacoustic signal 310 may be used to hack or take unauthorized control of the electronic device 314.

Referring back to FIG. 2, the at least one photoacoustic detection device 224 may be able to detect whether an incoming signal is a voice command generated by an authorized user or the photoacoustic signal 310. If the signal is a photoacoustic signal 310, then the processor 202 may initiate a counter measure. If the signal is not a photoacoustic signal 310, then the processor 202 may allow the signal to reach the microphone 212 to be executed by the voice activated assistant 218. The voice activated assistant 218 may generate a control signal in response to the signal and transmit the control signal via the communication interface 220.

In one embodiment, the at least one photoacoustic detection device 224 may include one or more microphones 204, a sensor array 206, and a speaker 222. In one embodiment, the microphone 204 may be a second microphone that is separate from the microphone 212 and located upstream of the microphone 212. In other words, the microphone 204 may be located physically in a position of the microphone controllable device 200 to intercept any incoming signals before the microphone 212 receives the incoming signals. In one embodiment, the microphone 204 may be activated while the microphone 212 is deactivated until the incoming signal is processed to determine whether or not the incoming signal is a photoacoustic signal 310.

In one embodiment, an incoming signal received by the microphone 204 may be analyzed by the processor 202. In one embodiment, the incoming signal may be compared to the voice signature 216. The voice signature 216 may be recorded during an initialization process. The voice of an authorized user or users may be recorded and stored in the memory 216.

In one embodiment, the voice signature 216 may include a waveform associated with an authorized voice that was recorded. The waveform of the incoming signal may be compared to the waveform of the voice signature 216 to determine if there is a match within a predefined threshold (e.g., greater than 95% match, greater than 99% match, and the like). If no match is found then the incoming signal may be detected to be a photoacoustic signal 310.

In one embodiment, the voice signature 216 may include various markers, wave forms, a certain pitch, a pace of speaking, and the like, that uniquely identify how a user speaks a voice command. The incoming signal may then be compared to the voice signature 216. If the incoming signal matches the unique markers of the voice signature 216, then the incoming signal may be an authorized voice command and the incoming signal may be passed to the microphone 212. However, if the incoming signal does not match the unique markers of the voice signature 216, then the incoming signal may be a photoacoustic signal 310 and the processor 202 may activate a counter measure.

In one embodiment, the sensor array 206 may include a heat sensor 210 and/or an optical sensor 210. The heat sensor 208 may detect changes to a temperature of the microphone controllable device 200 or the ambient air around the microphone controllable device 200. For example, heat sensor 208 may generate a signal when a temperature change above a threshold is detected (e.g., greater than 5 degrees Celsius, greater than 10 degrees Celsius, and the like). In turn, the detected change in temperature can be correlated with any potential incoming voice commands.

As noted above in FIG. 3, the lightwaves 306 may cause the object 308 or a portion of the microphone controllable device 200 to thermally expand. The additional heat generated by the lightwaves 306 may change a temperature of the ambient air around the microphone controllable device 200 or a portion of the microphone controllable device 200.

Since the microphone controllable device 200 is generally in a controlled environment with a relatively consistent temperature the heat sensor 208 may be used to detect changes in temperature. In one embodiment, the threshold may be modified and/or set as part of an initial calibration procedure. The processor 202 may activate a counter measure in response to receiving the signal that is generated by the heat sensor 208 when a change in temperature above a threshold is detected.

In one embodiment, the optical sensor 210 may detect the lightwaves 306. For example, when a light source 304 is used to apply the lightwaves 306 directly onto the microphone controllable device 200, the optical sensor 210 may detect the lightwaves 306. In response to detecting the lightwaves 306, the optical sensor 210 may generate a signal. The signal may be transmitted to the processor 202 and the processor 202 may activate a counter measure.

In one embodiment, the counter measure may be to deactivate the microphone 212. For example, the processor 202 may deactivate the microphone 212 to prevent the photoacoustic signal 310 from being received by the microphone 212 and transmitted to the voice activated assistant 218 for execution.

In one embodiment, the counter measure may be to generate a counter-signal. The counter-signal may be a signal that has an inverted waveform of the waveform of the photoacoustic signal 310. As a result, the counter-signal may cancel the photoacoustic signal 310 when combined. Cancelling the photoacoustic signal 310 may prevent the photoacoustic signal 310 from reaching the microphone 202. In one embodiment, the counter-signal may be generated by the processor 202 and emitted by the speaker 222.

It should be noted that the counter measures can be combined. For example, the microphone 212 may be deactivated and the counter-signal may be generated.

In one embodiment, the microphone controllable device 200 may communicate with the network 170 illustrated in FIG. 1 to track data. For example, a service provider may track how many times the photoacoustic signal 310 is detected, how often false positives are detected, and the like. The service provider may use the data to make changes to the counter measures or push updates based on the data to the at least one photoacoustic detection device 224.

In another embodiment, the service provider may push warnings or notifications to the microphone controllable devices 200 in an area when a number of photoacoustic signals 310 are detected in an area. For example, the unscrupulous actor 302 may be attempting to gain unauthorized control of electronic devices (e.g., a group of garage door openers) in a neighborhood. As the activations of the microphone controllable devices 200 are reported back to the networks 170, the service provider may detect a pattern of the attacks and notify other microphone controllable devices 200 in the neighborhood or area.

Figure 4:
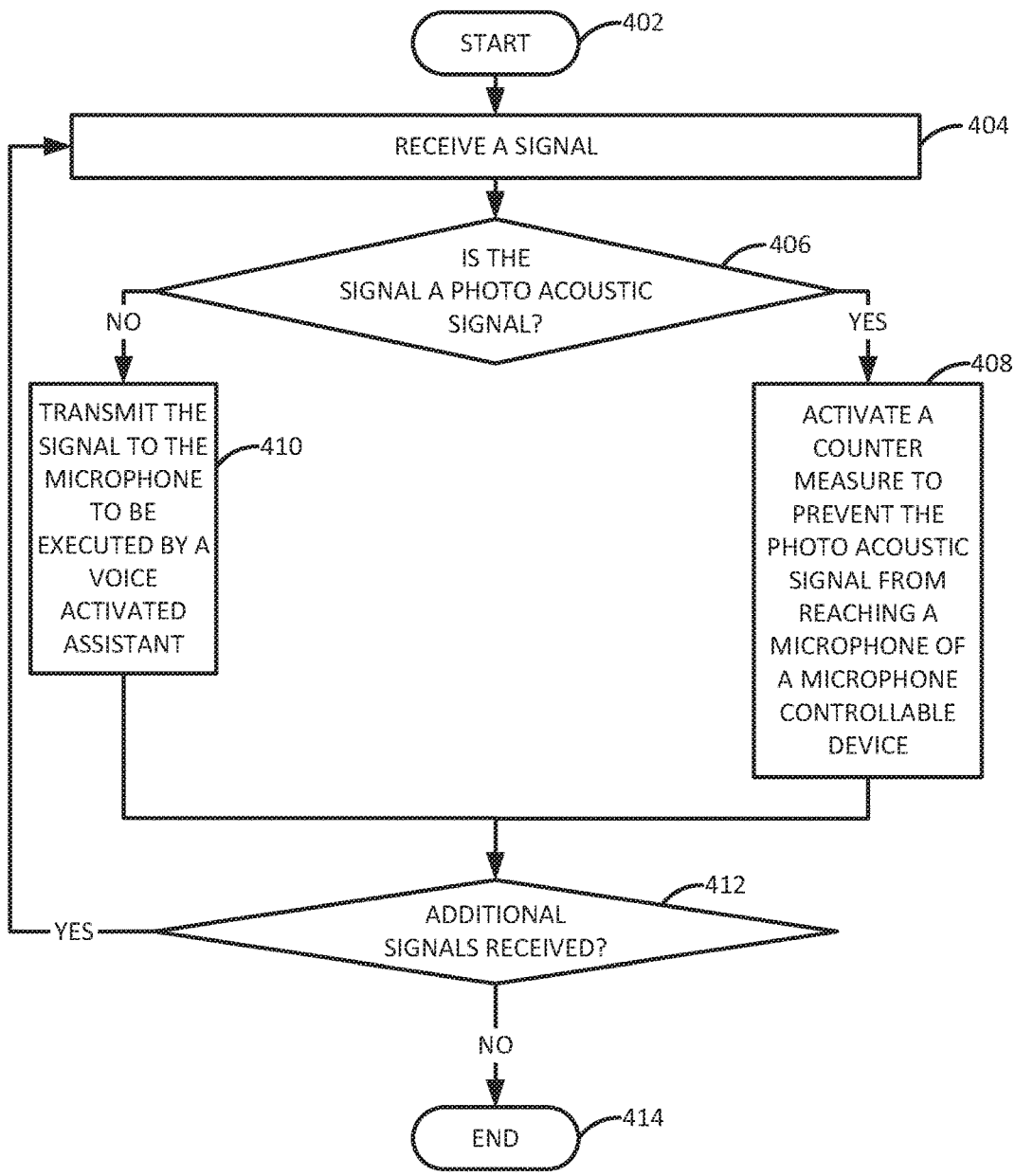
FIG. 4 illustrates a flowchart of an example method for detecting a photoacoustic light signal to prevent unauthorized voice commands for a microphone-controllable device of the present disclosure.

FIG. 4 illustrates a flowchart of an example method 400 for detecting a photoacoustic light signal to prevent unauthorized voice commands for a microphone-controllable device of the present disclosure. In one example, steps, functions and/or operations of the method 400 may be performed by the endpoint devices 165 or 166, the microphone-controllable device 200, or operations of method 400 may be performed by a computing device or processing system, such as computing system 500 and/or hardware processor element 502 as described in connection with FIG. 5 below. The method 400 begins in step 402 and proceeds to step 414.

At step 402, the method 400 begins. At step 404, the method 400 receives a signal. The signal may be an audio waveform. However, the method 400 may determine whether the signal is a voice command from an authorized user or an unauthorized photoacoustic signal.

At step 406, the method 400 determines if the signal is a photoacoustic signal. In one embodiment, a comparison against a voice signature may be performed to determine if the signal is a photoacoustic signal. For example, a waveform of the voice signature may be compared to a waveform of the photoacoustic signal. If a match is found, then the signal may be determined to be an authorized voice command. If no match is found, then the signal may be determined to be a photoacoustic signal. In one embodiment, a match may be determined to be found when the waveforms match within a predefined percentage (e.g., greater than a 95% match, greater than a 99% match, and so forth).

In one embodiment, the voice signature may include certain markers that identify one or more unique attributes of the voice commands of an authorized user. For example, the voice signature may include a certain amplitude, a particular pitch, a pace at which commands are spoken, and the like. The comparison may look to see if the waveform has the same attributes as the voice signature to determine if the signal is a photoacoustic signal or an authorized voice command.

In one embodiment, the photoacoustic signal may be detected based on detection by a sensor. For example, a heat sensor may detect a sudden temperature increase above a threshold in relation to also receiving a voice command. Alternatively, an optical sensor may detect lightwaves that are used to generate the photoacoustic signal.

If the answer is yes, the method 400 may proceed to step 408. At step 408 the method 400 activates a counter measure to prevent the photoacoustic signal from reaching a microphone of a microphone controllable device. For example, the method 400 may deactivate a microphone that receives voice commands to be executed by a voice activated assistant. Deactivating the microphone may prevent the photoacoustic signal from being executed by the voice activated assistant.

In one embodiment, the counter measure may include generating a counter-signal. The counter-signal may be an inverted waveform of the photoacoustic signal. The counter-signal may be emitted by a speaker within the microphone controllable device to cancel the photoacoustic signal. After the counter measure is activated, the method 400 then proceeds to step 412.

Referring back to the step 406, if the answer is no, the method 400 may proceed to step 410. At step 410, the method 400 transmits the signal to the microphone to be executed by a voice activated assistant. The method 400 then proceeds to step 412.

At step 412, the method 400 determines if additional signals are received. If the answer is yes, then the method 400 may return to the step 404 and the method 400 may be repeated. If the answer is no, then the method 400 may proceed to step 414. At step 414, the method 400 ends.

It should be noted that the method 400 may be expanded to include additional steps, or may be modified to replace steps with different steps, to combine steps, to omit steps, to perform steps in a different order, and so forth. In addition, although not expressly specified above, one or more steps of the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

Figure 5:
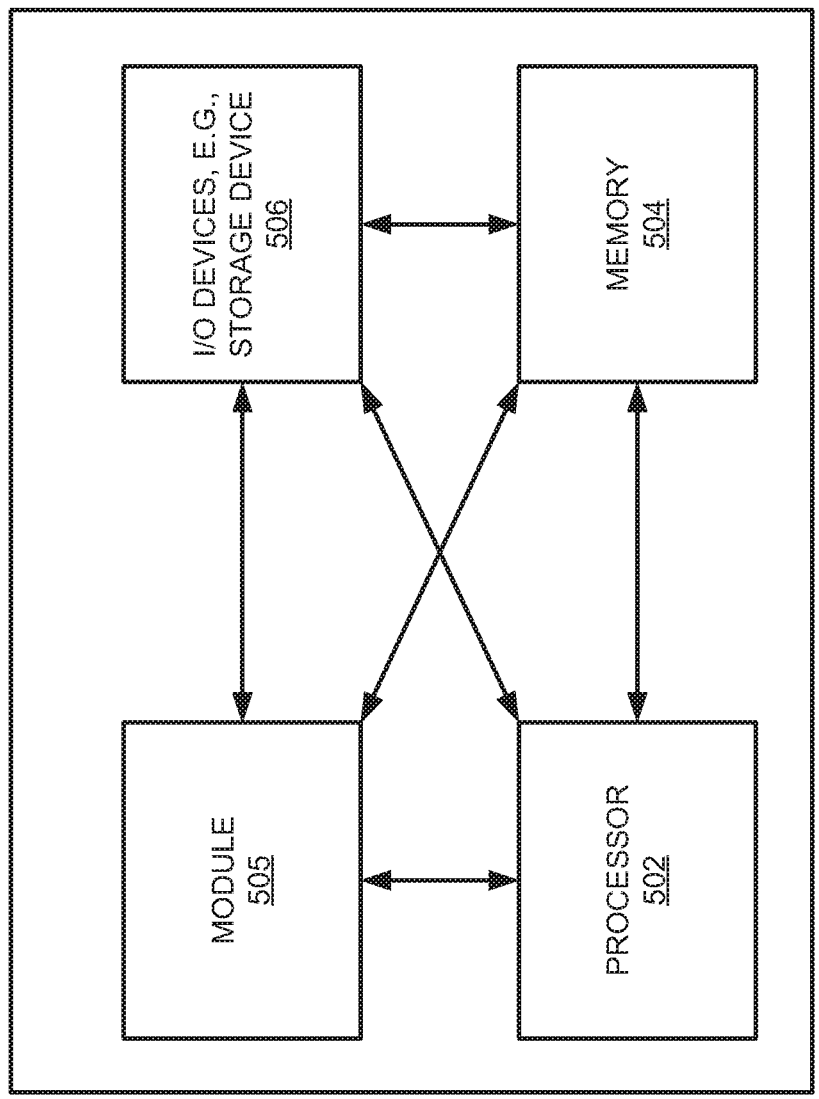
FIG. 5 illustrates a high-level block diagram of a computing device specially programmed to perform the functions described herein.

FIG. 5 depicts a high-level block diagram of a computing system 500 (e.g., a computing device or processing system) specifically programmed to perform the functions described herein. For example, any one or more components, devices, and/or systems illustrated in FIG. 1 or FIG. 2, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and/or the like, where the hardware processor element 502 may also represent one example of a "processing system" as referred to herein), a memory 504, (e.g., random access memory (RAM), read only memory (ROM), a disk drive, an optical drive, a magnetic drive, and/or a Universal Serial Bus (USB) drive), a module 505 for detecting a photoacoustic light signal to prevent unauthorized voice commands for a microphone-controllable device, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 502 is shown, the computing system 500 may employ a plurality of hardware processor elements. Furthermore, although only one computing device is shown in FIG. 5, if the method(s) as discussed above is implemented in a distributed or parallel manner for a particular illustrative example, e.g., the steps of the above method(s) or the entire method(s) are implemented across multiple or parallel computing devices, then the computing system 500 of FIG. 5 may represent each of those multiple or parallel computing devices. Furthermore, one or more hardware processor elements (e.g., hardware processor element 502) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 505 for detecting a photoacoustic light signal to prevent unauthorized voice commands for a microphone-controllable device (e.g., a software program comprising computer-executable instructions) can be loaded into memory 504 and executed by hardware processor element 502 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 502) executing the computer-readable instructions relating to the above described method(s) can be perceived as a programmed processor or a specialized processor. As such, the present module 505 for detecting a photoacoustic light signal to prevent unauthorized voice commands for a microphone-controllable device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
   receiving, by a processor, a signal;
   detecting, by the processor, that the signal is a photoacoustic signal generated by a thermal expansion and contraction of an object caused by at least one lightwave applied to the object; and
   activating, by the processor, a counter-measure to prevent the photoacoustic signal from reaching a microphone of a microphone-controllable device in response to detecting the photoacoustic signal.

2. The method of claim 1, wherein the detecting comprises:
   comparing, by the processor, the signal to a voice signature of a user of the microphone-controllable device to determine if a waveform of the signal matches a waveform of the voice signature.

3. The method of claim 1, wherein the detecting comprises:
   receiving, by the processor, an indication from a heat sensor that a temperature increase is above a threshold.

4. The method of claim 1, wherein the detecting comprises:
   receiving, by the processor, an indication from an optical sensor in response to detection of the at least one lightwave.

5. The method of claim 1, wherein the signal is received by a second microphone separate from the microphone of the microphone-controllable device.

6. The method of claim 1, wherein the activating comprises:
   deactivating, by the processor, the microphone in response to detecting that the signal is the photoacoustic signal.

7. The method of claim 1, wherein the activating comprises:
   generating, by the processor, a counter-signal to cancel the photoacoustic signal; and
   emitting, by the processor, the counter-signal.

8. The method of claim 7, wherein the counter-signal comprises an inverted waveform of the photoacoustic signal.

9. The method of claim 1, further comprising:
   controlling, by the processor, at least one electronic device wirelessly via the microphone-controllable device in response to the signal being a voice command.

10. The method of claim 1, wherein the object is a portion of the microphone-controllable device.

11. An apparatus comprising:
    at least one microphone to receive a signal to activate a voice-activated assistant application;
    at least one photoacoustic detection device to detect that the signal is a photoacoustic signal generated by a thermal expansion and contraction of a portion of the apparatus caused by at least one lightwave applied to the portion of the apparatus; and
    a processor communicatively coupled to the at least one microphone and the at least one photoacoustic detection device to activate a counter-measure to prevent the photoacoustic signal from reaching the at least one microphone.

12. The apparatus of claim 11, wherein the at least one photoacoustic detection device comprises:

a heat sensor to detect a temperature increase is above a threshold.

13. The apparatus of claim 11, wherein the at least one photoacoustic detection device comprises:
an optical sensor to detect the at least one lightwave.

14. The apparatus of claim 11, further comprising:
a second microphone to receive the signal; and
a memory to store a voice signature, wherein the processor is to compare the signal to the voice signature to determine whether a waveform of the signal matches a waveform of the voice signature.

15. The apparatus of claim 11, wherein the counter-measure comprises deactivation of the at least one microphone.

16. The apparatus of claim 11, wherein the counter-measure comprises generating a counter-signal to cancel the photoacoustic signal.

17. The apparatus of claim 16, further comprising:
a speaker to emit the counter-signal.

18. A non-transitory computer-readable medium storing instructions which, when executed by a processing system including at least one processor, cause the processing system to perform operations, the operations comprising:
receiving a signal;
detecting that the signal is a photoacoustic signal generated by a thermal expansion and contraction of an object caused by at least one lightwave applied to the object; and
activating a counter-measure to prevent the photoacoustic signal from reaching a microphone of a microphone-controllable device in response to detecting the photoacoustic signal.

19. The non-transitory computer-readable medium of claim 18, wherein the detecting comprises:
comparing the signal to a voice signature of a user of the microphone-controllable device to determine if a waveform of the signal matches a waveform of the voice signature.

20. The non-transitory computer-readable medium of claim 18, wherein the activating comprises:
deactivating the microphone or generating a counter-signal to cancel the photoacoustic signal.

* * * * *